United States Patent [19]

Miller

[11] Patent Number: 4,633,433
[45] Date of Patent: Dec. 30, 1986

[54] DISPLAY SYSTEM FOR DISPLAYING MAPS HAVING TWO-DIMENSIONAL ROADS

[75] Inventor: Irvin M. Miller, Poughkeepsie, N.Y.

[73] Assignee: International Business Machines Corporation, Armonk, N.Y.

[21] Appl. No.: 32,628

[22] Filed: Apr. 23, 1979

[51] Int. Cl.⁴ .................................... G06F 3/14
[52] U.S. Cl. ........................... 364/900; 340/723
[58] Field of Search ............ 340/722, 723, 728, 743, 340/725; 364/200, 900 MS File, 300, 520, 521, 522

[56] References Cited

U.S. PATENT DOCUMENTS

| | | | |
|---|---|---|---|
| T987,004 | 10/1979 | Feuer | 364/300 |
| 3,523,289 | 8/1970 | Harrison, III | 340/725 |
| 3,585,628 | 6/1971 | Harrison, III | 340/725 |
| 3,603,964 | 9/1971 | Harrison, III | 340/725 |
| 3,681,646 | 8/1972 | Brehm | 340/747 |
| 3,723,803 | 3/1973 | Harrison, III | 340/725 |
| 3,781,850 | 12/1973 | Gicca | 340/722 |
| 3,896,428 | 7/1975 | Williams | 340/723 |
| 4,058,849 | 11/1977 | Fitzgerald | 364/300 |
| 4,162,492 | 7/1979 | Jones, Jr. | 340/723 |

Primary Examiner—David Y. Eng
Attorney, Agent, or Firm—Robert W. Berray

[57] ABSTRACT

Method and apparatus for displaying maps on which the roads have width as well as length. The input to the system is a list of end points of line segments. The system operates upon this list to create a new set of line segment end points, defining two line segments for each one of the input line segments. The new line segments define roads having a predetermined width.

10 Claims, 10 Drawing Figures

DISPLAY SYSTEM FOR DISPLAYING MAPS HAVING TWO-DIMENSIONAL ROADS

INTRODUCTION

1. Field of the Invention

This invention relates to a system for displaying maps and other drawings that are made up of discrete line segments. More particularly, it relates to a system in which the input is a set of one-dimensional line segment definitions which the system changes to a set of two-dimensional line segment definitions so that the lines displayed will be seen as having a particular width.

2. Description of the Prior Art

There can be many applications in which drawings consisting of discrete line segments, with many intersections of the line segments, are displayed on a cathode ray tube or other display medium. It is quite common for the input to such display systems to specify each line segment in terms of its end points. A direct display of this input data would result in a display of line segments having only one dimension, length. No width to the line segments would be seen on the display. However, when displaying representations of items (such as, for example, roads on a map or city plan) which are normally known to have some width, it is much more pleasing from a human factors standpoint to indicate the second dimension, width, on the display. Of course, a primary reason that the inputs to these systems are often in the form of one-dimensional line segments is that this simple data is far easier to generate than are inputs which define two-dimensional line segments.

It is a primary object of this invention to provide a system which will accept input data defining one-dimensional line segments (line segments having length but no width) and convert it to data that define two-dimensional line segments (line segments which have both length and width) that are more esthetically pleasing to a human who interacts with a display medium.

It is a more particular object of this invention to provide a system which converts the one-dimensional data into two-dimensional data that are of such a form that substantially any system which can utilize the one-dimensional data will also be able to utilize the two-dimensional data without any modification.

Further objects of the invention include implementation of all aspects of it in a simple, low cost, manner.

SUMMARY OF THE INVENTION

In accordance with a preferred embodiment of the invention, the above and other objects are realized in a system for displaying plans such as street plans. The system converts the input one-dimensional representations to a set of two-dimensional representations in the following steps. First, the information contained in the input data is used to generate the definitions of a new set of lines comprising one pair of parallel lines surrounding each of the original line segments, each of the parallel lines being at a distance D/2 from the original line segment. D is the desired width of the resultant two-dimensional line representations. The next step is to select, from the input data, the end point of a line segment and to find all other lines which join the line segment at that point. The intersecting lines are then ordered so they may be handled in a systematic unambiguous manner. The next step is to calculate the point of intersection of each pair of intersecting lines from the generated set of parallel lines. These points of intersection will each be the new end point of two of the parallel lines. After all points defined in the input data have been processed in this manner, there will be a set of definitions of line segments which define a display in which, for each one-dimensional line segment defined by the original input data, there is a two-dimensional line segment having both length and width.

The primary advantage of this new system is that it accepts commonly available data that would normally display one-dimensional line segments and produces a more esthetically pleasing display of line segments having both length and width. Also, this is accomplished in a simple, low cost, manner. Further, a system utilizing this invention will generate a new set of data, defining the two-dimensional line segment display, which can be directly utilized by any system that is capable of accepting the commonly available one-dimensional line segment data, without requiring any modification to the system.

DETAILED DESCRIPTION

Figure 1:
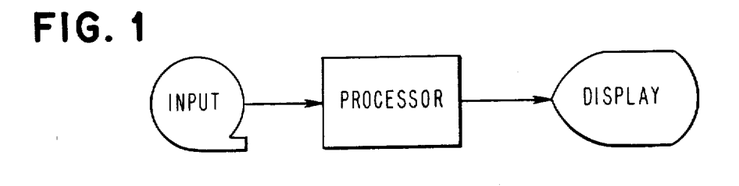
FIG. 1 is a schematic showing of a system embodying the invention.

FIG. 1 shows a display system embodying this invention. The elements of the system are a input medium, a data processor and a display terminal. The input medium is preferably a magnetic tape or disk, but it may be any other medium that is convenient to a particular application. The processor is preferably a general purpose computer, but if desired it could be a special purpose device that is used solely for processing data to be displayed. In the preferred embodiment of this invention, the display terminal is preferably a vector display device which displays lines as discrete vectors. However, it could be any other suitable display medium such as, for example, a plotter. The display system is preferably one which accepts lines that are defined by their end points, the two end points defining a line irrespective of its length.

Figure 2:
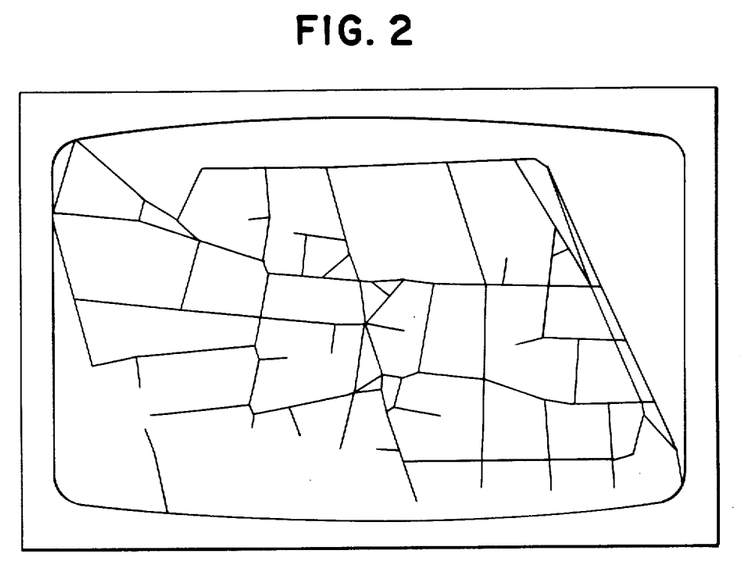
FIG. 2 illustrates a display made directly from a typical set of prior input data.

A system embodying this invention is especially suitable for display of street maps. In particular, the preferred embodiment is well designed for use with a set of magnetic tapes called DIME files that are generated by the United States Census Bureau. The DIME files define the streets in many cities of the United States. They comprise, for each of the cities, coordinates of the end points of line sections defining each street. FIG. 2 shows a display of the streets defined by a DIME file when it is displayed on a display device that is part of a system which does not include this invention. Each street on the display is shown as a one-dimensional line, having length but not width.

Figure 3:
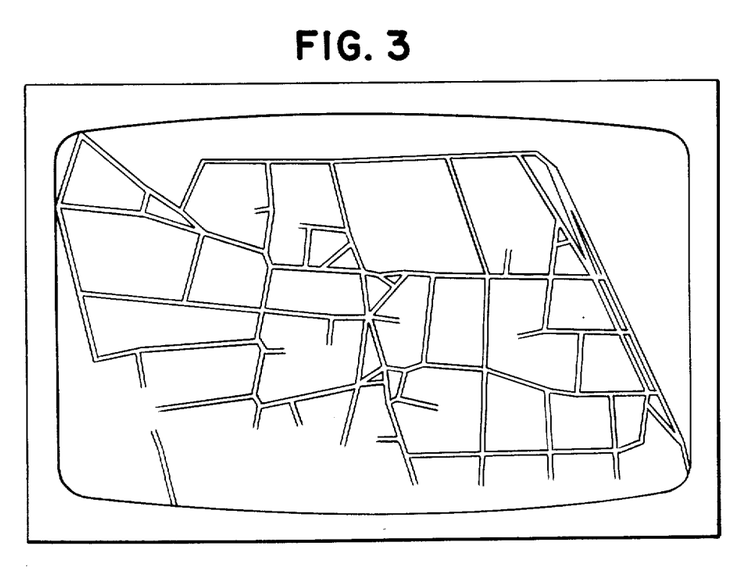
FIG. 3 illustrates a display made from data created by a system incorporating the invention.

FIG. 3 shows how the same set of streets would appear on a display device that is part of a system which includes this invention. The display shown in FIG. 3 differs from that of FIG. 2 in that each of the streets has width as well as length, making it look more like a street to the human eye. From a human factors standpoint, the display shown in FIG. 3 is much more pleasing than the prior art display shown in FIG. 2. Also, if the display were to include additional information such as, for example, the existance of fences, ledges, or other artificial or natural boundaries, that information could be shown as lines with no width and they would be readily distinguishable from the streets that are shown in FIG. 3.

Figure 4:
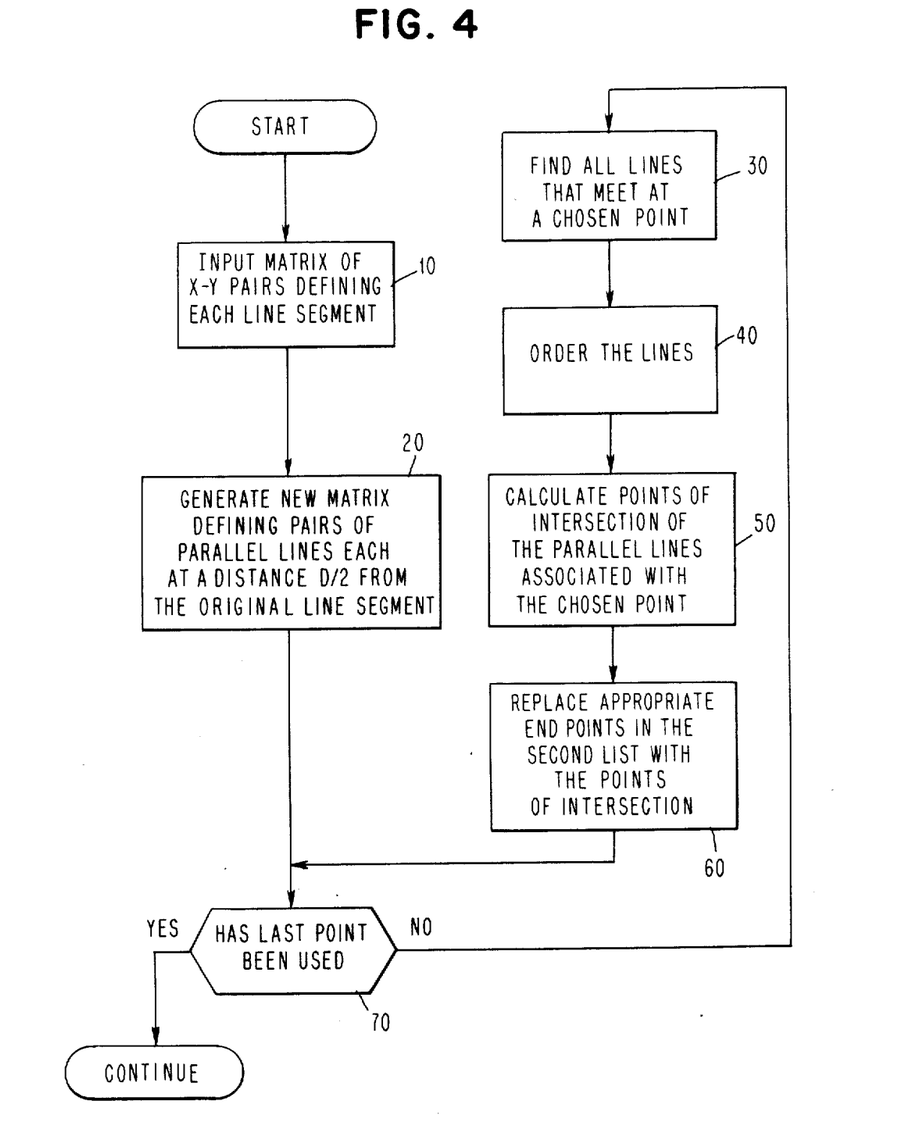
FIG. 4 is a summary flow diagram showing the steps performed by a system incorporating the invention.
Figures 5, 6:
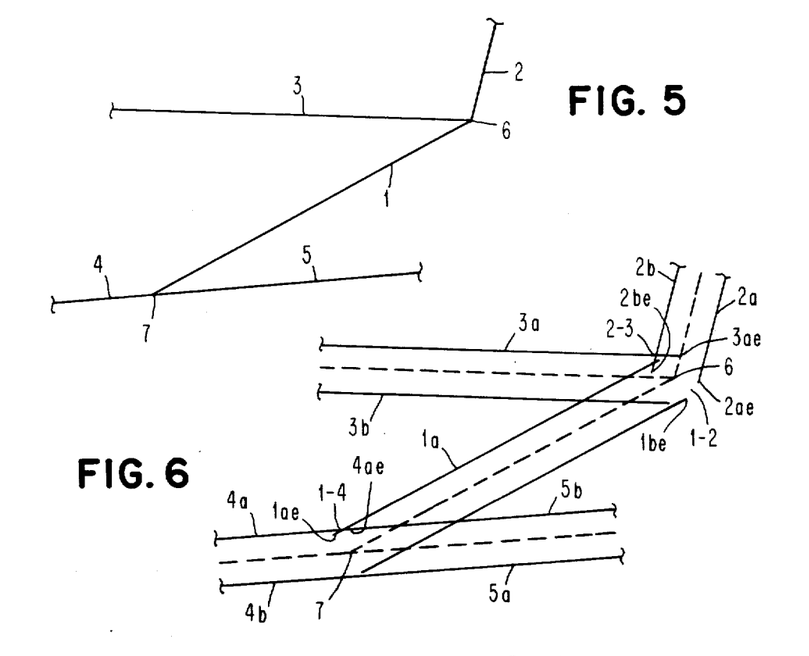
FIGS. 5, 6 and 7 illustrate how data are operated upon by a system incorporating the invention.
Figure 7:
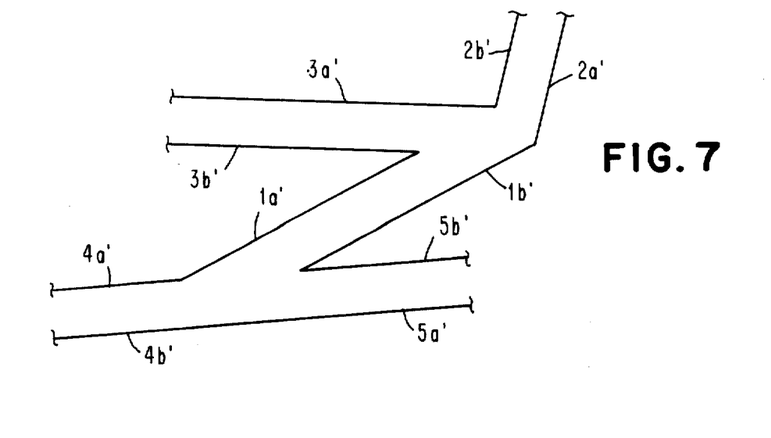

The operation of a preferred embodiment of this invention can be appreciated from FIGS. 4, 5. 6 and 7. FIG. 4 is a flow diagram illustrating the operation of a system incorporating the invention. FIGS. 5, 6 and 7 illustrate the graphical result obtained through operation of the system.

As shown in block 10 of FIG. 4, input data is first read into the system. If the input data is structured in a manner like the DIME files provided by the United States Census Bureau, it will consist of a 4×N matrix in which each row of the matrix provides (X,Y) pairs defining a line segment. Each row provides X1, Y1, X2 and Y2 where (X1,Y1) are the coordinates of a first end point of the line and (X2,Y2) are the coordinates of the second end point of the line. If this data were to be applied directly to a display medium, a display similar to that illustrated in FIG. 2 would result. A portion of a display like the one shown in FIG. 2 is shown in FIG. 5. In that Figure there is a complete line segment 1, and portions 2 and 3 of line segments which have end points in common with one of the end points of line 1, and portions 4 and 5 of line segments which have end points in common with the other end point of line 1.

As shown in block 20 of FIG. 4, the system then generates, from the input matrix, a new matrix defining pairs of parallel lines, each line in a pair being a distance D/2 from a line segment defined by the original input data. In FIG. 6, the broken lines represent lines defined by the original input data that are shown in FIG. 5. As shown in FIG. 6, lines 1a and 1b are parallel to, and each is a distance D/2 from, original line 1. Likewise, lines 2a and 2b are parallel to, and a distance D/2 from, the location of original line 2; lines 3a and 3b, 4a and 4b and 5a and 5b are parallel to, and a distance D/2 from, original lines 3, 4 and 5, respectively. If the parallel lines are so generated that the end points of a pair of parallel lines and each of the end points of the line to which they are parallel define a line that is perpendicular to the original line (as is done in the preferred embodiment of the invention) the parallel lines will appear as shown in FIG. 6. Inspection of FIG. 6 will reveal some of the problems that are overcome by the invention in this system. For example, lines 3b and 1a should intersect, and they should terminate at the intersection point. However, each of these lines continues beyond the intersection point (and line 1a even intersects line 2b which it should not touch). Also, the straight line formed by line segments 4a and 5b go completely through the "road" bordered by lines 1a and 1b instead of terminating on each side. (Line 4a should terminate at its intersection with line 1a. Line 5b should terminate at its intersection with line 1b.) Furthermore, lines 1b and 2a, which should intersect, do not even touch. Correction of these esthetic faults is the primary function of the remaining steps defined in the flow diagram of FIG. 4.

In order to remove excess portions of line segments (the portions that extend beyond a point of intersection with another line segment) and to add portions to line segments which do not meet other line segments they should intersect, it is necessary to identify the intersecting pairs of lines. In the preferred embodiment of the invention, identification of these pairs is accomplished from an analysis of the original input data. First, an end point is selected from the input matrix. Then all lines that meet at that chosen point are identified. This identification merely involves scanning the input matrix to find all lines having an end point that has the same coordinates as the chosen point. In order that the following steps will be performed unambiguously for each line intersecting at the chosen point, the preferred embodiment of the invention assigns an order, or sequence, to the lines intersecting at the chosen point (FIG. 4, block 40). The lines are ordered in accordance with the angle made between them and the X-axis of a set of coordinates that has its origin at the chosen point. The angle varies from 0 to $2\pi$ radians. Taking, as an example, point 6 in FIG. 5, the sequence of the lines which meet at that point would be line 2, then line 3, then line 1. The sequence of lines meeting at point 7 would be line 5, then line 1, then line 4.

The next step (FIG. 4, block 50) is to determine the points of intersection of lines in the second matrix. In the preferred embodiment, the first intersection point to be considered is the one between (1) the parallel line to the left of the first line (in sequence about the chosen point) and (2) the line to the right of the second line (in sequence about the chosen point). Then the intersection is considered between (1) the parallel line to the left of the second line in sequence about the chosen point and (2) the parallel line to the right of the third line of sequence about the chosen point; etc. In this embodiment, "right" and "left" (also referred to herein as "plus" and "minus", respectively) are defined as the direction with respect to an observer located at the chosen point, looking in the direction of the line from the chosen point. Considering the lines associated with point 6 in FIG. 6, the first intersection to be calculated would be the one between lines 2b and 3a, the second intersection to be calculated would be the one between lines 3b and 1a, and the third intersection to be calculated would be the one between lines 1b and 2a. With respect to point 7, the sequence of calculation of the intersections would be: first, the one between lines 5b and 1b; second, the one between lines 1a and 4a; and third, the one between lines 4b and 5a. Note that, for calculations associated with point 6, line 1a, is to the right of the original line and 1b is to the left of the original line; with respect to calculations associated with point 7, because the new origin is presumed to be at point 7, line 1b is to the right of original line 1 and line 1a is to the left of original line 1.

As the points of intersection are calculated, each point of intersection becomes an end point for each of the two lines that intersect (block 60). For example, referring again to FIG. 6: the coordinates of point 1-4 (the intersection of lines 1a and 4a) would replace the coordinates of points 1ae and 4ae (the original end points of lines 1a and 4a respectively); the coordinates of point 2-3 (the intersection of lines 2b and 3a) would replace the coordinates of points 2be and 3ae (the original end points of lines 2b and 3a, respectively); and the coordinates of point 1-2 (the point at which lines 1b and 2a would intersect if they were extended far enough will replace the coordinates of points 1be and 2ae (the end points of lines 1b and 2a, respectively).

After all points in the input matrix have been used by the system (block 70, FIG. 4) a new set of data will be available that defines the desired display of two-dimensional elements. A display resulting from this data will appear as shown in FIG. 7. The individual lines shown in FIG. 7 are labeled 1a', 1b', 2a', 2b', etc. in order to indicate their association to related lines in FIG. 6.

Figure 8A:
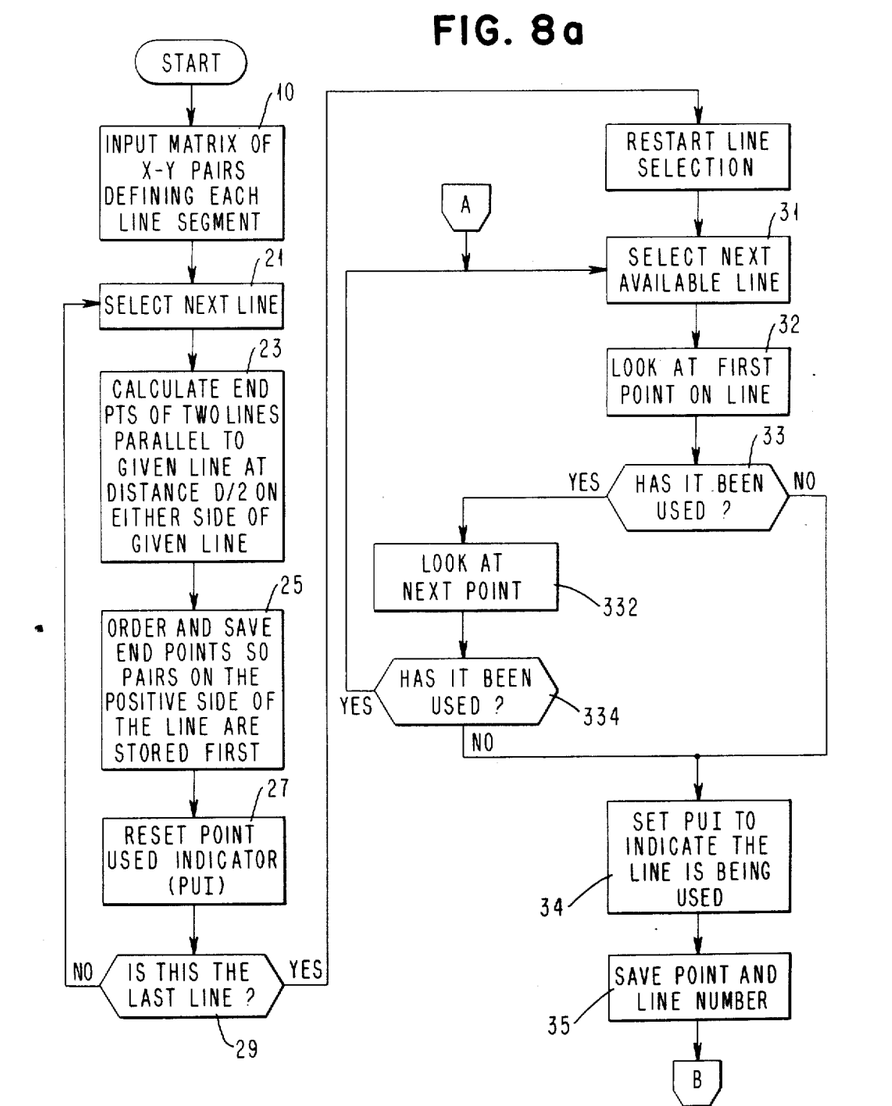
FIGS. 8a-8c more detailed flow diagrams showing the steps performed by a preferred embodiment of the invention.

FIG. 8 is a flow diagram showing additional details of operation of the preferred embodiment of the invention. After a matrix of (X,Y) pairs defining line segments has been entered into the system (block 10) the (X,Y) pairs defining one line are selected (block 21). Then the end points of two lines parallel to the selected line, each at a distance D/2 (where D is the desired width of the elements on the display) on each side of the selected line are calculated (block 23). The end points so calculated are set into a matrix in which the end points defining the parallel line on the plus (positive) side of the selected line are stored before the end points defining the parallel line on the minus (negative) side of the selected line (block 25). As the points are stored into the matrix, a "point used indicator" (PUI) is reset (block 27) to show that neither of the points has been subjected to the processing described below. If the selected line is not the last line defined by the input matrix (block 29) the above steps are repeated. If it is the last line, then the second matrix is complete.

Figure 8B:
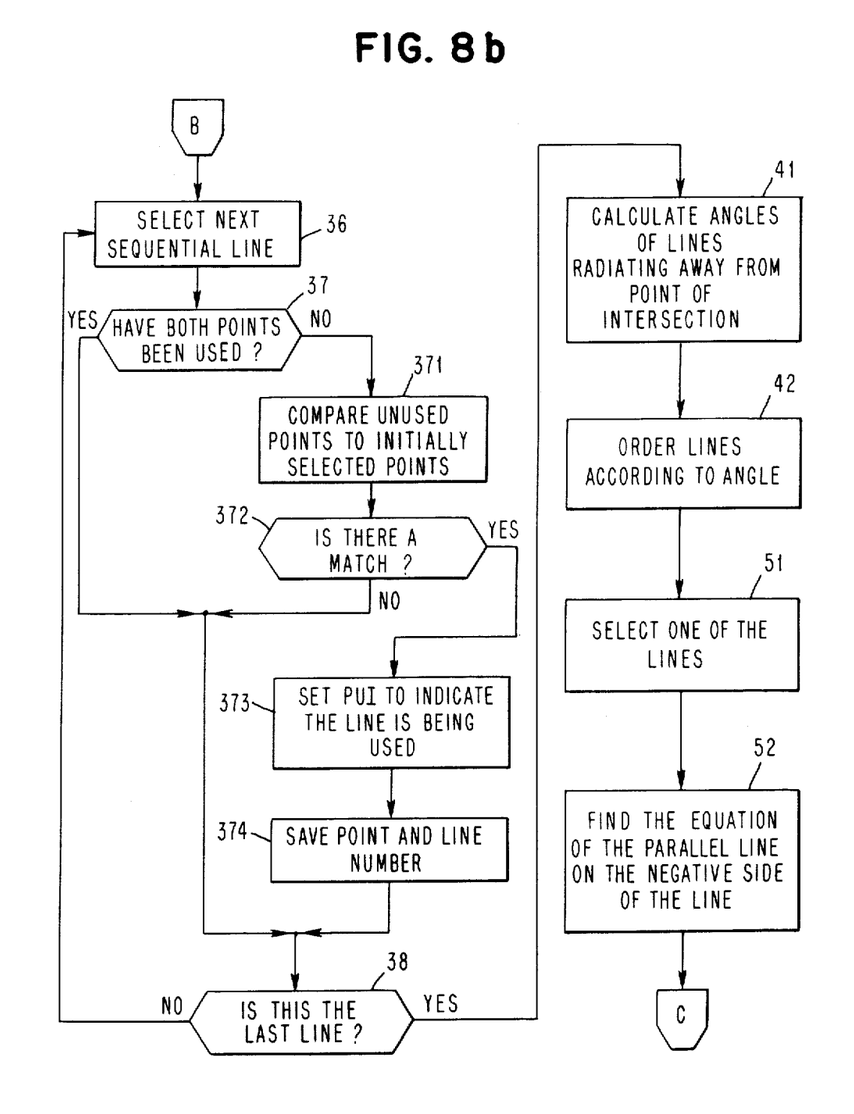

The following steps will identify points of intersection of lines defined by the input matrix, and the lines which intersect at each point. Selection of lines defined by the points in the input matrix is restarted. A line is selected from the input matrix (block 31). The PUI associated with the first point on the line is checked (block 32) to determine if the point has been used (block 33). If it has been used, the PUI associated with the other point on the line is checked (block 332) to determine if it also has been used (block 334). If both of the points defining the selected line have been used, another line is selected (block 31). If one of the points defining the selected line has not been used, its PUI is set to indicate it is now being used (block 34) and an identification of the point and the line are saved (block 35). Then the next sequential line is selected (block 36). If one or both of the points on this line have not been used (block 37) the unused point(s) is (are) compared to the initially selected points (block 371). If there is a match (block 372) the PUI is set (block 373) to indicate the point is being used and the point and line identifications are saved (block 374). If this is not the last line which intersects the chosen point (block 38) the next sequential line is selected (block 36) and the above steps are repeated. These steps will have identified all of the lines that intersect at a particular chosen point.

After the above steps, the lines which intersect the chosen point are ordered so that they can be processed systematically. In the preferred embodiment, ordering is accomplished by calculating, for each of the selected lines, the angle between it and the X-axis of a set of coordinates having its origin at the point (node) being considered (block 41). The lines are then ordered according to this angle (block 42).

Figure 8C:
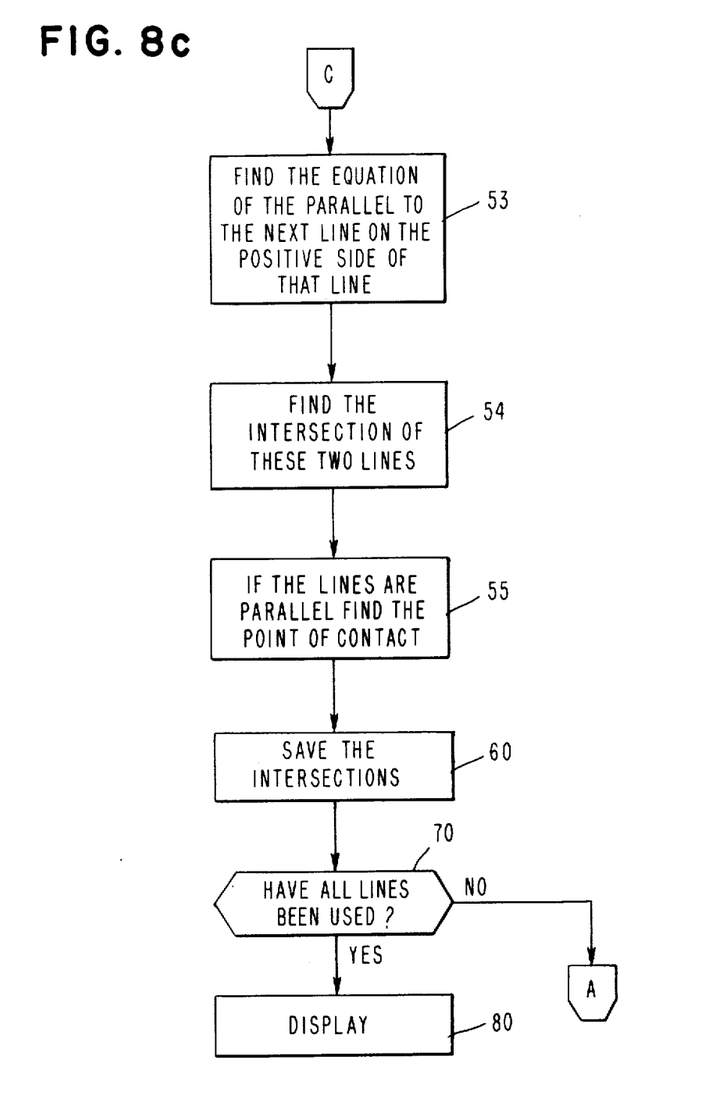

After the lines which intersect at a particular point have been identified, and their angles calculated, one of them is selected (block 51). The equation which defines the parallel line on the negative side of the selected line is determined (block 52) as is the equation of the parallel line on the positive side of the next ordered line (block 53). From these equations, the point of intersection of the two lines is determined (block 54) or, if the lines are parallel, their point of contact is determined (block 55). The point of intersection (or contact) is saved (block 60) and will replace the previously stored end points of the two lines (block 25).

If there are still any lines remaining that have not been used (block 57) the next available line is selected (block 31) so that another intersection point and its associated line can be identified. If all lines have been used, the matrix of end points of parallel lines (block 25) will contain the line identifications which will be used for causing a display medium to draw the desired output (block 80).

This invention depends for its realization (whether it be embodied in specal purpose hardware or in programmed general purpose hardware) upon various analytical relationships. For example, in order to generate the second matrix, the preferred embodiment generates a definition of lines parallel to, and spaced a given distance from, the line defined by the input data. (The input data define lines by specifying the end points.) The preferred embodiment also generates definitions of lines perpendicular to a given line and determines the intersection point of two lines. Some of the analytical relationships are described below.

GENERATION OF PARALLEL LINES

A line is described by the equation $$Ax+By+C=0. \tag{1}$$

The distance D from a point to a line is $$D=(Ax+By+C)/(A^2+B^2)^{\frac{1}{2}}. \tag{2}$$

Therefore, the equation which describes a line that is a distance D from the line defined by Equation (1) is $$Ax+By+(C-D(A^2+B^2)^{\frac{1}{2}})=0. \tag{3}$$

Considering the fact that the parallel line can be on either side of the original line, Equation (3) can be generalized to $$Ax+By+(C\pm D(A^2+B^2)^{\frac{1}{2}})=0. \tag{4}$$

Equation (4) thus represents two lines that are parallel to the original line defined by Equation (1).

GENERATION OF PERPENDICULAR LINES

A line perpendicular to the line defined by Equation (1) is $$-Bx+Ay+E=0 \tag{5}$$

where E is an arbitrary constant. If it is desired that the lines defined by Equations (1) and (5) intersect, a point of intersection can be identified and a value of E determined. If it is desired that point of intersection be an end point of the line defined by Equation (1), and the end point is defined by the coordinate pair $(x_1,y_1)$, then Equation (5) becomes $$-Bx_1+Ay_1+E=0, \text{ and} \tag{6}$$

$$E=Bx_1-Ay_1. \tag{7}$$

INTERSECTION OF THE PARALLEL AND PERPENDICULAR LINES

The intersections of the perpendicular line defined by Equations (6) and (7) with the parallel lines defined by Equation (4) are obtained by solving the sets of simultaneous equations. Their solution produces the sets of coordinates $$Y = -(AE+BF)/(A^2+B^2) \text{ and}$$

$$X = (BE-AF)/(A^2+B^2) \tag{8}$$

where $$F = C \pm D(A^2+B^2)^{\frac{1}{2}}. \tag{9}$$

The two sets of (x,y) coordinates defined by Equations (8) are one end point of each of the lines that is parallel to the original line defined by Equation (1). The other end point of each of the parallel lines can be found in a manner similar to the one described above. These lines are then assembled into the second list (matrix) previously described. The second list will contain two entries for each of the entries in the first list.

The preferred embodiment of the invention utilizes a general purpose digital computer (such as an IBM System/370 Model 158) and the following FORTRAN program which is designed to use DIME data comprising an array (XYC) defining a number NRF of line segments. In the program: IU is the point used indicator; IC is a line number indicating which end of a line is being looked at (and whether the line has been used); AN is the angle of a line with the X-axis; ID is a test parameter; XY is the second matrix; and ABC is as defined in Equation (1) above. The program is designed to produce data for a display in which the elements (e.g., roads) have a width of 0.006 units (D/2=0.003).

```
      SUBROUTINE DTST(XYC,NRF)
      DIMENSION XYC(4,1),IU(500),IC(2,15),AN(15),ID(2)
      DIMENSION XY(8,300),ABC(3,2)
      XW=.003
      DO 1 I=1,NRF
      A=XYC(2,I)-XYC(4,I)
      B=XYC(3,I)-XYC(1,I)
      C=(XYC(1,I)*XYC(4,I))-XYC(2,I)*XYC(3,I)
      AB=(A*A)+(B*B)
      DO 34 J=1,2
      CC=C+((2*(J/2))-1)*XW*(AB**.5)
      DO 34 L=1,2
      M=(2*L)-1
      X=XYC(M,I)
      Y=XYC(M+1,I)
      E=(B*X)-A*Y
      Y=-((A*E)+B*CC)/AB
      X=((B*E)-A*CC)/AB
      S=(A*X)+(B*Y)+C
      IF(S)35,36,36
   35 M=M+4
   36 XY(M,I)=X
      XY(M+1,I)=Y
   34 CONTINUE
    1 IU(I)=0
      DO 3 I=1,NRF
      K=I+1
      DO 3 J=1,2
      N=0
      M=(2*J)-1
      IB=IU(I)
      ID(1)=IB-2*(IB/2)
      ID(2)=IB-ID(1)
      IF(ID(J)-J)9,3,9
    9 X=XYC(M,I)
      Y=XYC(M+1,I)
      IU(I)=IB+J
      N=N+1
      IC(1,N)=J
      IC(2,N)=I
      IF(K-NRF)17,17,3
   17 DO 4 L=K,NRF
      IB=IU(L)
      IF(IB-2)5,6,4
    5 IF(IB)6,6,8
    6 IP=1
      GO TO 7
    8 IP=2
    7 IB=IB+IP
      M=(2*IP)-1
      IF(X-XYC(M,L))11,10,11
   10 IF(Y-XYC(M+1,L))11,12,11
   11 IP=3-IB
      IF(IP)4,4,13
   13 M=(2*IP)-1
      IF(X-XYC(M,L))4,14,4
   14 IF(Y-XYC(M+1,L))4,12,4
   12 IU(L)=IU(L)+IP
      N=N+1
      IC(1,N)=IP
      IC(2,N)=L
    4 CONTINUE
      IF(N-1)3,25,15
   15 DO 20 L=1,N
      K=IC(1,L)
      K=(2*K)-1
      K1=4-K
      M=IC(2,L)
      DX=XYC(K1,M)-XYC(K,M)
      K=K+1
      K1=6-K
      DY=XYC(K1,M)-XYC(K,M)
   20 CALL ANGL(DX,DY,AN(L))
      NX=N
   21 IFL=0
      NX=NX-1
      DO 22 L=1,NX
      K=L+1
      IF(AN(L)-AN(K))22,22,23
   23 AT=AN(L)
      AN(L)=AN(K)
      AN(K)=AT
      DO 24 M=1,2
      AT=IC(M,L)
      IC(M,L)=IC(M,K)
   24 IC(M,K)=AT
      IFL=1
   22 CONTINUE
      IF(IFL)25,25,21
   25 DO 27 L=1,N
      L1=L
      DO 26 LL=1,2
      M=IC(1,L1)
      M=(2*M)-1
      M1=4-M
      K=IC(2,L1)
      A=XYC(M+1,K)-XYC(M1+1,K)
      B=XYC(M1,K)-XYC(M,K)
      C=(XYC(M,K)*XYC(M1+1,K))-XYC(M+1,K)*XYC(M1,K)
      AB=(A*A)+(B*B)
      C=C+((2*(LL/2))-1)*XW*(AB**.5)
      ABC(1,LL)=A
      ABC(2,LL)=B
      ABC(3,LL)=C
   26 L1=1+L-N*(L/N)
      CALL INTER(ABC,X,Y,ICP)
      IF(ICP)28,28,29
   29 E=(B*XYC(M,K))-A*XYC(M+1,K)
      Y=-((A*E)+B*C)/AB
      X=((B*E)-A*C)/AB
   28 K=L
      DO 30 LL=1,2
      M=IC(2,K)
      A=XYC(2,M)-XYC(4,M)
      B=XYC(3,M)-XYC(1,M)
      C=(XYC(1,M)*XYC(4,M))-XYC(2,M)*XYC(3,M)
```

```
        -continued
      S=(A*X)+(B*Y)+C
      K=IC(1,K)
      K=(2*K)-1
      IF(S)32,31,31
   32 K=K+4
   31 XY(K,M)=X
      XY(K+1,M)=Y
   30 K=1+L-N*(L/N)
   27 CONTINUE
    3 CONTINUE
      RETURN
      END
```

The following FORTRAN subroutine is used to calculate the angle between a line and the X-axis.

```
      SUBROUTINE ANGL(DX,DY,AN)
      PI=3.14159
      IF(DY)1,2,3
    2 IF(DX)4,5,5
    5 AN=0.
      GO TO 6
    4 AN=PI
      GO TO 6
    1 IF(DX)7,8,9
    8 AN=1.5*PI
      GO TO 6
    7 AN=PI+ATAN(DY/DX)
      GO TO 6
    9 AN=(2*PI)+ATAN(DY/DX)
      GO TO 6
    3 IF(DX)10,11,12
   11 AN=.5*PI
      GO TO 6
   10 AN=PI+ATAN(DY/DX)
      GO TO 6
   12 AN=ATAN(DY/DX)
    6 RETURN
      END
```

The following FORTRAN subroutine is used to calculate the point at which two lines intersect.

```
      SUBROUTINE INTER(ABC,X,Y,ICP)
      DIMENSION ABC(3,2)
      ICP=1
      DO 1 I=1,2
      IF(ABC(I,1)-ABC(I,1))2,1,2
    1 CONTINUE
      GO TO 3
    2 D=ABC(2,1)*ABC(1,2)-ABC(2,2)*ABC(1,1)
      X=(ABC(2,2)*ABC(3,1)-ABC(2,1)*(ABC(3,2))/D
      Y=(ABC(1,1)*ABC(3,2)-ABC(1,2)*ABC(3,1))/D
      ICP=0
    3 RETURN
      END
```

Although the preferred embodiment of this invention comprises a programmed general purpose computer for performing the data conversions described above, those skilled in the art will recognize that the descriptions contained herein also define, as an alternative implementation, a special purpose apparatus which, without the need of any particular program, performs the operations described.

Those skilled in the art will also recognize that the input data need not be in precisely the format described here. Substantially any input that defines a set of lines could be used. Of course, some other forms of input data might require some additional processing, but this would present no problem to those skilled in the art.

Also, an implementation of the invention need not necessarily contain a fixed width for the reformatted display. The width could be an input parameter. It could also be varied rather than being constant throughout the display. (This could be of particular value in certain types of displays such as, for example, a sewer plan for a city, or a plumbing plan for a large building.)

It is also very significant to note that it would be within the scope of the invention to create a new set of data (on any convenient medium) defining the enhanced display, and then, at some later time, use the new data to control a display unit that is totally separate from the system which created the new data.

The essential elements of the invention are: a set of input definitions of line segments; a mechanism for generating pairs of lines parallel to the input line segments; a mechanism for finding intersections of the generated line segments; and a mechanism for using the intersection points to define (or redefine) the end points of the parallel line segments.

While the invention has been described with reference to a preferred embodiment thereof, it will be understood by those skilled in the art that the above and other changes may be made therein without departing from the spirit and scope of the invention.

Having thus described my invention, what I claim as new, and desire to secure by Letters Patent is:

1. In a method for displaying drawings which consists of intersecting line segment representations, a method for converting input data defining one-dimensional line segment representations having length but no width into data defining two-dimensional representations having length and width, comprising the steps of:
   generating definitions of pairs of lines parallel to the lines defined by the input data;
   identifying points of intersection of the lines defined by said generated definitions; and
   combining the identified points of intersection with the generated definitions to establish the end points of said pairs of lines, said pairs of lines comprising the two-dimensional representations.

2. The method of claim 1 further including the additional step of displaying said two-dimensional representations.

3. In a method for displaying drawings which consist of intersecting line segment representations, a method for converting input data defining one-dimensional line segment representations having length but no width into data defining two-dimensional representations having length and width, comprising the steps of:
   accessing a first table containing said input data;
   creating a second table of definitions of two-dimensional representations associated with the one-dimensional line segment representations defined in said first table;
   deriving, from said first table, a list of all one-dimensional line segment representations that meet at a chosen point;
   ordering the lines in said derived list in a predetermined manner;
   calculating points of intersection of representations defined in said second table that are associated with line segment representations in said derived list; and
   placing said points of intersection into said second table as part of said definitions of two-dimensional representations.

4. The method of claim 3 in which said deriving, ordering, calculating and placing steps are repeated for different chosen points until all Points defined by the input data in said first table have been chosen.

5. The method of claim 4 in which said ordering step comprises:
sequencing the lines in said derived list in accordance with the angle they make with the X-axis of a set of coordinates having its origin at the chosen point.

6. In apparatus for displaying drawings which consist of intersecting line segment representations, means for converting input data defining one-dimensional line segment representations having length but not width into data defining two-dimensional representations having length and width, comprising:
means for generating definitions of pairs of lines parallel to the lines defined by the input data;
means for identifying points of intersection of the lines defined by said generated definitions; and
means for combining the identified points of intersection with the generated definitions to establish the end points of said pairs of lines comprising the two-dimensional representations.

7. The apparatus of claim 6 further including means for displaying said two-dimensional representations.

8. In apparatus for displaying drawings which consist of intersecting line segment representations, means for converting input data defining one-dimensional line segment representations having length but no width into data defining two-dimensional representations having length and width, comprising:

means for accessing a first table containing said input data;
means for creating a second table of definitions of two-dimensional line segment representations associated with the one-dimensional line segment representations defined in said first table;
means for deriving, from said first table, a list of all one-dimensional line segment representations that meet at a chosen point;
means for ordering the lines in said drived list in a predetermined manner;
means for calculating points of intersection of representations defined in said second table that are associated with line segment representations in said derived list; and
means for placing said points of intersection into said second table as part of said definitions of two-dimensional line segment representations.

9. The apparatus of claim 8 in which said deriving, ordering, calculating and placing means are utilized repeatedly for different chosen points until all points defined by the input data in said first table have been chosen.

10. The apparatus of claim 9 in which said ordering means comprises:
means for sequencing the lines in said derived list in accordance with the angle they make with the X-axis of a set of coordinates having its origin at the chosen point.

* * * * *